United States Patent
Boualleg et al.

(10) Patent No.: US 12,458,960 B2
(45) Date of Patent: *Nov. 4, 2025

(54) METHOD FOR PREPARING A CATALYST COMPRISING A NICKEL ACTIVE PHASE DISTRIBUTED IN A CRUST VIA IMPREGNATION OF HEPTANOL

(71) Applicant: IFP ENERGIES NOUVELLES, Rueil-Malmaison (FR)

(72) Inventors: Malika Boualleg, Rueil-Malmaison (FR); Laetitia Jothie, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 17 days.

This patent is subject to a terminal disclaimer.

(21) Appl. No.: 18/576,257

(22) PCT Filed: Jul. 12, 2022

(86) PCT No.: PCT/EP2022/069500
§ 371 (c)(1),
(2) Date: Jan. 3, 2024

(87) PCT Pub. No.: WO2023/001642
PCT Pub. Date: Jan. 26, 2023

(65) Prior Publication Data
US 2024/0326032 A1    Oct. 3, 2024

(30) Foreign Application Priority Data
Jul. 22, 2021 (FR) ........................ 2107963

(51) Int. Cl.
*B01J 21/04* (2006.01)
*B01J 23/755* (2006.01)
(Continued)

(52) U.S. Cl.
CPC .......... *B01J 37/0205* (2013.01); *B01J 21/04* (2013.01); *B01J 23/755* (2013.01); *B01J 35/393* (2024.01);
(Continued)

(58) Field of Classification Search
CPC ........ B01J 21/04; B01J 23/755; B01J 35/397; B01J 37/0203; B01J 37/0207;
(Continued)

(56) References Cited

U.S. PATENT DOCUMENTS

| 4,519,951 A | * | 5/1985 | Qualeatti ................ C11C 3/126 554/144 |
| 8,637,719 B2 | | 1/2014 | Fischer et al. |

(Continued)

FOREIGN PATENT DOCUMENTS

| WO | WO-2005094418 A2 * | 10/2005 | ............ B01J 23/755 |
| WO | WO-2019137836 A1 * | 7/2019 | ............ B01J 23/755 |

(Continued)

OTHER PUBLICATIONS

Goula et al. (Nickel on alumina catalysts for the production of hydrogen rich mixtures via the biogas dry reforming reaction: Influence of the synthesis method, International Journal of Hydrogen Energy vol. 40, Issue 30, Aug. 10, 2015, pp. 9183-9200).*

(Continued)

*Primary Examiner* — Jun Li
(74) *Attorney, Agent, or Firm* — Millen, White, Zelano & Branigan; Brion P. Heaney

(57) ABSTRACT

Process for preparing a catalyst comprising a nickel active phase and an alumina support, said catalyst comprising between 1% and 50% by weight of elemental nickel relative to the total weight of the catalyst, the nickel being distributed both over a crust at the periphery of the support, and at the core of the support, which process comprises the following steps:

(Continued)

a) said support is impregnated with a volume V1 of a heptanol solution of between 0.2 and 0.8 times the total pore volume TPV of said support in order to obtain an impregnated support;
b) the impregnated support obtained at the end of step a) is impregnated with a solution comprising a precursor of the nickel active phase in order to obtain a catalyst precursor;
c) the catalyst precursor obtained at the end of step b) is dried at a temperature below 250° C.

15 Claims, 1 Drawing Sheet

(51) Int. Cl.
| | | |
|---|---|---|
| *B01J 35/00* | (2024.01) | |
| *B01J 35/10* | (2006.01) | |
| *B01J 35/30* | (2024.01) | |
| *B01J 37/00* | (2006.01) | |
| *B01J 37/02* | (2006.01) | |
| *B01J 37/08* | (2006.01) | |
| *B01J 37/18* | (2006.01) | |
| *C07C 5/05* | (2006.01) | |
| *C07C 5/11* | (2006.01) | |
| *B01J 35/51* | (2024.01) | |

(52) U.S. Cl.
CPC ......... *B01J 35/394* (2024.01); *B01J 37/0018* (2013.01); *B01J 37/0203* (2013.01); *B01J 37/0207* (2013.01); *B01J 37/0213* (2013.01); *B01J 37/0236* (2013.01); *B01J 37/024* (2013.01); *B01J 37/088* (2013.01); *B01J 37/18* (2013.01); *C07C 5/05* (2013.01); *C07C 5/11* (2013.01); *B01J 35/51* (2024.01); *B01J 2235/15* (2024.01); *C07C 2521/04* (2013.01); *C07C 2523/755* (2013.01)

(58) Field of Classification Search
CPC .. B01J 37/088; C07C 2523/755; C10G 45/36; C10G 45/48
See application file for complete search history.

(56) References Cited

U.S. PATENT DOCUMENTS

| | | | |
|---|---|---|---|
| 11,951,456 B2 * | 4/2024 | Boualleg | ................ B01J 37/024 |
| 12,064,751 B2 * | 8/2024 | Dubreuil | ................ B01J 23/755 |
| 12,083,506 B2 * | 9/2024 | Dubreuil | .................. B01J 35/23 |
| 12,121,882 B2 * | 10/2024 | Dubreuil | .................... C07C 5/11 |
| 2010/0217052 A1 | 8/2010 | Ungar et al. | |
| 2012/0065442 A1 | 3/2012 | Geyer et al. | |
| 2015/0099622 A1 | 4/2015 | Ko et al. | |
| 2020/0338531 A1 * | 10/2020 | Boualleg | ................ C01F 7/021 |
| 2022/0266225 A1 * | 8/2022 | Dubreuil | .............. B01J 37/0205 |
| 2022/0288569 A1 | 9/2022 | Dubreuil et al. | |

FOREIGN PATENT DOCUMENTS

| | | | | |
|---|---|---|---|---|
| WO | WO-2019197352 A1 * | 10/2019 | .......... | B01J 37/0205 |
| WO | WO-2019201617 A1 * | 10/2019 | ............. | C10G 45/48 |
| WO | WO-2019201618 A1 * | 10/2019 | ............. | C10G 45/48 |
| WO | WO-2021018600 A1 * | 2/2021 | ............. | B01J 21/04 |
| WO | WO-2021018601 A1 * | 2/2021 | ............. | B01J 21/04 |
| WO | WO-2021018602 A1 * | 2/2021 | ............. | B01J 21/04 |
| WO | WO-2021018603 A1 * | 2/2021 | ............. | B01J 21/04 |
| WO | 2022002674 A1 | 1/2022 | | |

OTHER PUBLICATIONS

Uemura et al. (Characterization of Nickel-Alumina Catalysts Impregnated in Alcohol Solution, The Japan Petroleum Institute, Sekiyu Gakkaishi, 30, (1), 53-58 (1987)).*
International Search Report PCT/EP2022/069500 dated Oct. 24, 2022 (pp. 1-2).
Jang Min-Su et al: "Facile preparation of egg-shell-type pellet catalysts using immiscibility between hydrophobic solvent and hydrophilic solution: Enhancement of catalytic activity due to position control of metallic nickel inside alumina pellet", Applied Catalysis A: General, Elsevier, Amsterdam, NL, vol. 530, Nov. 16, 2016 (Nov. 16, 2016), pp. 211-216, XP029858638, ISSN: 0926-860X, DOI: 10.1016/J.APCATA.2016.11.025.

* cited by examiner

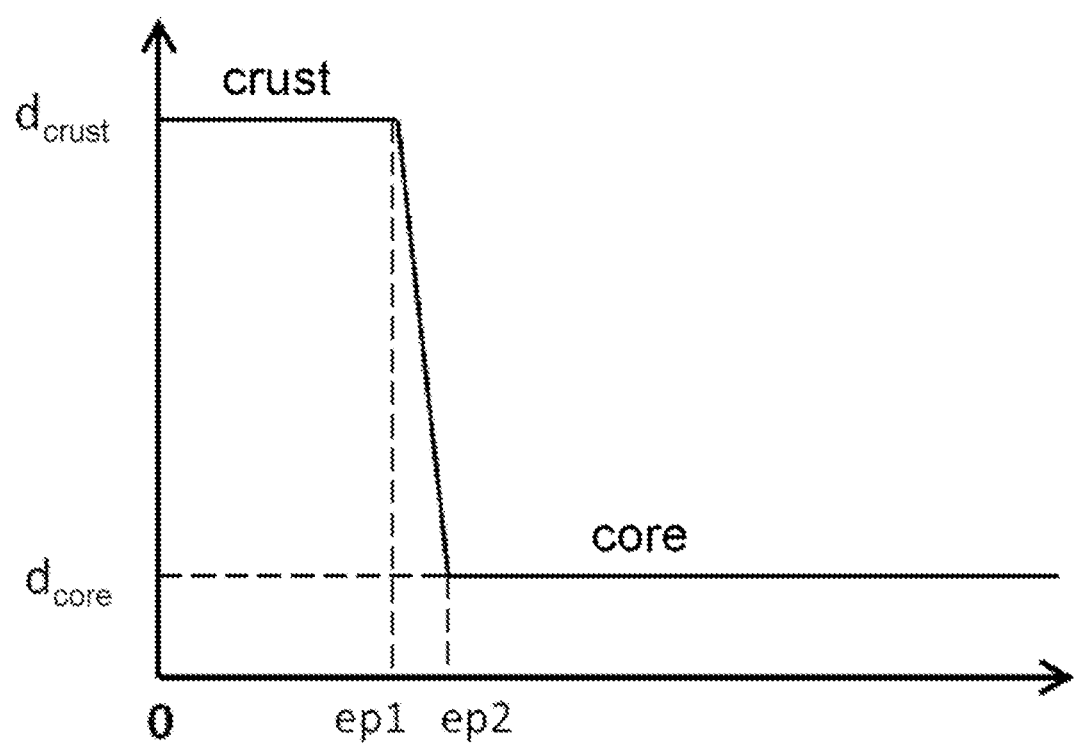

METHOD FOR PREPARING A CATALYST COMPRISING A NICKEL ACTIVE PHASE DISTRIBUTED IN A CRUST VIA IMPREGNATION OF HEPTANOL

TECHNICAL FIELD

The present invention relates to a process for preparing a supported metal catalyst based on nickel intended particularly for the hydrogenation of unsaturated hydrocarbons, and more particularly for the selective hydrogenation of polyunsaturated compounds or the hydrogenation of aromatics.

PRIOR ART

Monounsaturated organic compounds, such as, for example, ethylene and propylene, are at the root of the manufacture of polymers, of plastics and of other chemicals having added value. These compounds are obtained from natural gas, from naphtha or from gas oil which have been treated by steam cracking or catalytic cracking processes. These processes are carried out at high temperature and produce, in addition to the desired monounsaturated compounds, polyunsaturated organic compounds, such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ gasoline fraction (gasolines containing hydrocarbon compounds having 5 or more carbon atoms), in particular styrene or indene compounds. These polyunsaturated compounds are highly reactive and result in side reactions in the polymerization units. It is thus necessary to remove them before making economic use of these fractions. Selective hydrogenation is the main treatment developed to specifically remove undesirable polyunsaturated compounds from these hydrocarbon feedstocks. It enables the conversion of polyunsaturated compounds to the corresponding alkenes or aromatics while avoiding the complete saturation thereof and thus the formation of the corresponding alkanes or naphthenes.

Selective hydrogenation catalysts are generally based on metals from Group VIII of the Periodic Table, preferably palladium or nickel. The metal is provided in the form of metal particles deposited on a support. The metal content, the size of the metal particles and the distribution of the active phase in the support are among the criteria which have an influence on the activity and the selectivity of the catalysts.

The macroscopic distribution of the metal particles in the support constitutes an important criterion, mainly in the context of rapid and consecutive reactions such as selective hydrogenations. It is generally desirable for these elements to be located in a crust at the periphery of the support in order to avoid problems of intragranular material transfer which may result in activity defects and a loss of selectivity. Such catalysts are also referred to as "eggshell" catalysts.

Such catalysts are widely known in the case of selective hydrogenation catalysts based on palladium. Indeed, owing to the low palladium content (generally less than 1% by weight (1 wt %) of palladium relative to the catalyst) and suitable preparation processes, a thin crust of palladium at the periphery of the support grains can be obtained (FR2922784, US2010/217052).

It is often proposed to replace palladium with nickel, a metal which is less active than palladium, and which it is therefore necessary to have in a larger amount in the catalyst. Thus, nickel-based catalysts generally have a metal content of between 5% and 50% by weight of nickel relative to the catalyst. In these catalysts, the nickel is generally distributed homogeneously within the support. One possible way of improving these catalysts in terms of activity and selectivity is to control the distribution of nickel within the support by depositing the nickel in a more concentrated manner on a crust, at the periphery of the support. Such catalysts are known from the prior art.

Document U.S. Pat. No. 4,519,951 describes an "eggshell" catalyst with nickel on a porous support having a pore volume of at least 0.2 ml/g for the pores having a size of less than 11.7 nm and a pore volume of at least 0.1 ml/g for the pores having a size of greater than 11.7 nm. More than 50% of the nickel is found in a crust, the thickness of which is equal to 0.15 times the radius of the support. This catalyst is used for the hydrogenation of fats.

Document CN101890351 describes a supported nickel catalyst in which more than 90% of the nickel is found in a 700 μm-thick crust. The catalyst is prepared using an ammoniacal solution to dissolve the nickel salt. These catalysts are used in a selective hydrogenation application.

Document US 2012/0065442 describes a supported nickel catalyst with the nickel distributed both on a crust with a thickness of 3% to 15% of the diameter and at the core, the nickel concentration ratio between the crust and the core being between 3.0:1 and 1.3:1. The nickel active phase is deposited by spray coating of an ammoniacal solution of a nickel salt on the support.

Document FR3099387 describes a process for preparing a nickel-based catalyst on an alumina support obtained according to a very specific method, the nickel being distributed both on a crust at the periphery of the support, and at the core of the support, the thickness of said crust being between 2% and 15% of the diameter of the catalyst. The process for preparing such a catalyst requires firstly the use of a specific alumina support that has undergone a hydrothermal treatment in the presence of an acid solution, and secondly the implementation of a step of hydrothermal treatment after adding a specific organic additive to the catalyst precursor.

Subjects of the Invention

Surprisingly, the applicant has discovered that carrying out a particular step of impregnating a heptanol solution on a porous alumina support, regardless of its origin, and this without carrying out an intermediate drying step between the impregnation of heptanol and the impregnation of the precursor of the active nickel phase, makes it possible to obtain a catalyst in which at least one portion of the nickel is distributed over a crust at the periphery of the support, the other portion of the nickel being distributed in the core of the catalyst. Without wishing to be bound by any theory, the presence of heptanol prevents the migration of the active nickel phase to the core of the support. This is because only a portion of the porosity is occupied by the heptanol. In addition, since the heptanol and water are poorly miscible, the heptanol layer constitutes a barrier to the diffusion of nickel to the core of the support.

The present invention thus relates to a new process for preparing a catalyst which makes it possible to obtain a catalyst comprising performance qualities at least as good, or even better, in terms of activity and selectivity within the context of the selective hydrogenation reactions of polyunsaturated compounds or hydrogenation reactions of aromatics, while using a lower effective amount of nickel phase (i.e. an amount of nickel located ultimately in the crust at the periphery of the support allowing the selective hydrogenation reactions or hydrogenation reactions of aromatics to be carried out) than the amount typically used in the prior art, this being due to a better distribution of the active nickel phase in the support, making the latter more accessible to the reagents.

One subject of the present invention is a process for preparing a catalyst comprising an active phase based on nickel and an alumina support, said catalyst comprising between 1% and 50% by weight of elemental nickel relative to the total weight of the catalyst, the nickel being distributed both over a crust at the periphery of the support, and at the core of the support, the thickness of said crust being between 2% and 15% of the diameter of the catalyst, the size of the nickel particles in the catalyst, measured in oxide form, being less than 15 nm, which process comprises the following steps:
  a) said support is impregnated with a volume V1 of a heptanol solution of between 0.2 and 0.8 times the total pore volume TPV of said support in order to obtain an impregnated support;
  b) the impregnated support obtained at the end of step a) is impregnated with a solution comprising at least one precursor of the nickel active phase in order to obtain a catalyst precursor;
  c) the catalyst precursor obtained at the end of step b) is dried at a temperature below 250° C.

According to one or more embodiments, in step b), the volume V2 of the solution comprising at least one precursor of the nickel active phase impregnated on the impregnated support obtained at the end of step a) is such that V2=TPV−V1.

According to one or more embodiments, step c) is carried out for a time of between 0.5 hour and 12 hours.

According to one or more embodiments, said process further comprises a step d) in which the catalyst obtained at the end of step c) is calcined at a temperature of between 250° C. and 600° C.

According to one or more embodiments, step d) is carried out for 0.5 hour to 24 hours.

According to one or more embodiments, in step a), said volume V1 of said heptanol solution is between 0.25 and 0.75 times the total pore volume TPV of said support.

According to one or more embodiments, in step a), a solution of n-heptanol is used.

According to one or more embodiments, said process further comprises a step b1) in which either the impregnated support obtained at the end of step a), or the catalyst precursor obtained at the end of step b), is impregnated with at least one solution containing at least one organic compound comprising at least one carboxylic acid function, or at least one alcohol function, or at least one ester function, or at least one amide function, or at least one amine function, steps b) and b1) being carried out in any order, or simultaneously.

According to one or more embodiments, the volume V2 of the solution comprising at least one precursor of the active nickel phase and the volume V3 of the solution comprising at least one organic compound which are impregnated on the impregnated support obtained at the end of step a) are such that V2+V3=TPV−V1.

According to one or more embodiments, steps b) and b1) are carried out simultaneously.

According to one or more embodiments, the volume V2' of the solution comprising at least one precursor of the active nickel phase and at least one organic compound which are impregnated on the impregnated support obtained at the end of step a) is such that V2'=TPV−V1.

According to one or more embodiments, the mole ratio of said organic compound introduced in step b1) to the nickel element also introduced in step b) is between 0.01 and 5.0 mol/mol.

According to one or more embodiments, the organic compound of step b1) is chosen from oxalic acid, malonic acid, glycolic acid, lactic acid, tartronic acid, citric acid, tartaric acid, pyruvic acid, levulinic acid, ethylene glycol, propane-1,3-diol, butane-1,4-diol, glycerol, xylitol, mannitol, sorbitol, diethylene glycol, glucose, gamma-valerolactone, dimethyl carbonate, diethyl carbonate, formamide, N-methylformamide, acetamide, N-methylacetamide, N,N-dimethylmethanamide, 2-pyrrolidone, γ-lactam, lactamide, urea, alanine, arginine, lysine, proline, serine, EDTA.

According to one or more embodiments, a step a1) is carried out in which the impregnated support obtained at the end of step a) is left to mature for 0.5 hour to 40 hours.

According to one or more embodiments, a step a1) is carried out in which the impregnated support obtained at the end of step a) is left to mature for 0.5 hour to 40 hours.

According to one or more embodiments, the size of the nickel particles in the catalyst, measured in oxide form, is less than 13 nm.

BRIEF DESCRIPTION OF THE FIGURE

FIG. 1 is a diagram showing the distribution of nickel in the catalyst. The x-axis corresponds to the thickness of the catalyst, measured from the edge of the catalyst (in μm). The y-axis corresponds to the nickel density (in grams of Ni/mm$^3$). The nickel is distributed both on a crust at the periphery of the support, of thickness ep1, and in the core of the support. The nickel density on the crust $d_{crust}$ is greater than the nickel density in the core of the support $d_{core}$. The transition interval between the core and the crust of the catalyst has a thickness denoted ep2-ep1.

DETAILED DESCRIPTION OF THE INVENTION

1. Definitions

In the text hereinbelow, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

In the present description, according to the IUPAC convention, "micropores" are understood to mean the pores having a diameter of less than 2 nm, i.e. 0.002 μm; "mesopores" are understood to mean the pores having a diameter of greater than 2 nm, i.e. 0.002 μm, and less than 50 nm, i.e. 0.05 μm, and "macropores" are understood to mean the pores having a diameter of greater than 50 nm, i.e. 0.05 μm.

In order to analyze the distribution of the metallic phase on the support, a crust thickness is measured by Castaing microprobe (or electron microprobe microanalysis). The device used is a CAMECA XS100, equipped with four monochromator crystals allowing the simultaneous analysis of four elements. The Castaing microprobe analysis technique consists of the detection of X-rays emitted by a solid after excitation of its elements by a high-energy electron beam. For the purposes of this characterization, the catalyst grains are coated in blocks of epoxy resin. These blocks are polished until the cross section through the diameter of the beads or extrudates is reached, and then metallized by depositing carbon in a metal evaporator. The electron probe is scanned along the diameter of five beads or extrudates to obtain the mean distribution profile of the constituent elements of the solids. This method, well known to those skilled in the art, is defined in the publication by L. Sorbier et al. *"Measurement of palladium crust thickness on catalyst by EPMA"* Materials Science and Engineering 32 (2012). It makes it possible to establish the distribution profile of a given element, here nickel, within the grain. Furthermore, the Ni concentration is defined for each measurement and therefore for each analysis step. The density of Ni within the grain is therefore defined as the concentration of Ni per $mm^3$.

The total pore volume is measured by mercury porosimetry according to the standard ASTM D4284-92 with a wetting angle of 140°, for example using an Autopore III™ model device from the brand Micromeritics™.

The BET specific surface area is measured by nitrogen physisorption according to the standard ASTM D3663-03, a method described in the work by Rouquerol F., Rouquerol J. and Singh K., *"Adsorption by Powders & Porous Solids: Principles, Methodology and Applications"*, Academic Press, 1999).

The term "size of the nickel particles" is understood to mean the diameter of the nickel crystallites in oxide form. The diameter of the nickel crystallites in oxide form is determined by X-ray diffraction, from the width of the diffraction line located at the angle $2\theta=43°$ (that is to say, along the crystallographic direction [200]) using the Scherrer relationship. This method, used in X-ray diffraction on polycrystalline samples or powders, which links the full width at half maximum of the diffraction peaks to the size of the particles, is described in detail in the reference: Appl. Cryst. (1978), 11, 102-113, "Scherrer after sixty years: A survey and some new results in the determination of crystallite size", J. I. Langford and A. J. C. Wilson.

The content of nickel is measured by X-ray fluorescence.

2. Process for Preparing the Catalyst

The steps of said preparation process are described in detail below.

Step a)

According to step a) of the process, the alumina support is impregnated with a volume V1 of a heptanol solution of between 0.2 and 0.8 times the total pore volume (also referred to here as TPV) of said support to be impregnated, preferably between 0.25 and 0.75.

Heptanol is understood to mean the organic compounds comprising an alcohol function corresponding to the empirical chemical formula C7H16O. Heptanol is thus understood to mean the family of the following organic compounds: heptan-1-ol (or n-heptanol), heptan-2-ol, and isomers thereof. Preferably, step a) is carried out in the presence of heptan-1-ol.

Step a1) (Optional)

After step a), the impregnated support can be matured in the wet state for 0.5 hour to 40 hours, preferably for 1 hour to 30 hours. The maturation step a1) is preferably carried out at a temperature below or equal to 60° C., and more preferentially at ambient temperature. This step enables the migration of the heptanol solution to the core of the support. When it is carried out, the maturation step a1) allows the heptanol solution to strengthen the migration to the core of the support and to liberate a "ring of free pores" at the periphery of the support accessible by the nickel during the step of impregnation of the precursor of the active phase.

Step b)

During step b) of the process, the impregnated porous alumina support obtained at the end of step a) (or the matured impregnated porous alumina support obtained at the end of step a1)) is impregnated with a solution comprising at least one precursor of the nickel active phase in order to obtain a catalyst precursor. The impregnation step can be carried out by dry impregnation or excess impregnation according to methods that are well known to those skilled in the art.

The pH of said solution comprising at least one precursor of the impregnated nickel active phase can be modified by the optional addition of an acid or a base.

Preferably, said nickel precursor is introduced in aqueous solution, for example in nitrate, carbonate, acetate, chloride or oxalate form, in the form of complexes formed by a polyacid or an acid alcohol and its salts, in the form of complexes formed with acetylacetonates or in the form of any other inorganic derivative soluble in aqueous solution, which is brought into contact with said support. Preferably, use is advantageously made, as nickel precursor, of nickel nitrate, nickel chloride, nickel acetate or nickel hydroxycarbonate. Very preferably, the nickel precursor is nickel nitrate.

The concentration of nickel in solution is adjusted depending on the pore volume of the support still available so as to obtain, for the supported catalyst, a nickel content of between 1% and 50% by weight of nickel element relative to the total weight of the catalyst, more preferentially between 2% and 40% by weight and even more preferentially between 3% and 35% by weight and even more preferentially 5% and 25% by weight.

Step b1) (Optional)

When step b1) is carried out, the impregnated porous alumina support obtained at the end of step a) (or matured impregnated porous alumina support obtained at the end of step a1)) or the catalyst precursor obtained at the end of step b) is impregnated with a solution containing at least one organic compound comprising at least one carboxylic acid function, or at least one alcohol function, or at least one ester function, or at least one amide function, or at least one amine function, said steps b) and b1) being carried out in any order, or simultaneously.

The impregnation step can be carried out by dry impregnation or excess impregnation according to methods that are well known to those skilled in the art. This is because it has in addition been noticed that the catalysts prepared in the presence of an organic compound (mentioned below) are more active than the catalysts prepared in the absence of this type of organic compound. This effect is related to the decrease in the size of the nickel particles.

Said solution containing at least one organic compound comprising at least one carboxylic acid function is preferably aqueous. Said organic compound is, beforehand, at least partially dissolved in said solution at the desired concentration. The pH of said solution can be modified by the optional addition of an acid or of a base.

Advantageously, the mole ratio of said organic compound introduced in step b1) to the nickel element also introduced in step b) is between 0.01 and 5.0 mol/mol, preferably between 0.05 and 2.0 mol/mol, more preferentially between 0.1 and 1.5 mol/mol and even more preferentially between 0.3 and 1.2 mol/mol.

Said organic compound comprising at least one carboxylic acid function may be a saturated or unsaturated aliphatic organic compound or an aromatic organic compound. Preferably, the saturated or unsaturated aliphatic organic compound comprises between 1 and 9 carbon atoms, preferably between 2 and 7 carbon atoms. Preferably, the aromatic organic compound comprises between 7 and 10 carbon atoms, preferably between 7 and 9 carbon atoms.

Said saturated or unsaturated aliphatic organic compound or said aromatic organic compound comprising at least one carboxylic acid function may be chosen from monocarboxylic acids, dicarboxylic acids, tricarboxylic acids or tetracarboxylic acids.

Advantageously, the organic compound comprising at least one carboxylic acid function is chosen from ethanedioic acid (oxalic acid), propanedioic acid (malonic acid), pentanedioic acid (glutaric acid), hydroxyacetic acid (glycolic acid), 2-hydroxypropanoic acid (lactic acid), 2-hydroxypropanedioic acid (tartronic acid), 2-hydroxypropane-1,2,3-tricarboxylic acid (citric acid), 2,3-dihydroxybutanedioic acid (tartaric acid), 2-oxopropanoic acid (pyruvic acid) or 4-oxopentanoic acid (levulinic acid).

Implementations of Steps b) and b1)

The process for preparing the nickel catalyst may comprise several embodiments if step b1) is carried out. They differ in particular in the order of introduction of the organic compound and of the nickel precursor, it being possible for the organic compound to be brought into contact with the support either after the nickel precursor is been bought into contact with the impregnated support obtained at the end of step a) (or a1)), or before the nickel precursor is brought into contact with the impregnated support obtained at the end of step a) (or a1)), or at the same time as the nickel is brought into contact with the impregnated support obtained at the end of step a) (or a1)).

A first embodiment consists in carrying out said step b) prior to said step b1) (post-impregnation).

A second embodiment consists in carrying out said step b1) prior to said step b) (pre-impregnation).

Each step b) and b1) of impregnating the impregnated support with the nickel precursor, and of impregnating the impregnated, optionally matured, support with at least one solution containing at least one organic compound comprising at least one carboxylic acid function is carried out at least once and may advantageously be carried out several times, optionally in the presence of a nickel precursor and/or of an organic compound which is (are) identical or different in each step b) and/or b1) respectively, all possible combinations of implementations of steps b) and b1) being included in the scope of the invention.

Preferably, the volume V2 of the solution comprising at least one precursor of the active nickel phase and the volume V3 of the solution comprising at least one organic compound which are impregnated on the impregnated, optionally matured, support obtained at the end of step a) are such that V2+V3=TPV−V1.

A third embodiment consists in carrying out said step b) and said step b1) simultaneously (co-impregnation). This embodiment may advantageously comprise the implementation of one or more steps b), optionally with an identical or different nickel precursor in each step b). In particular, one or more steps b) precede and/or advantageously follow said co-impregnation step, optionally with an identical or different nickel precursor in each step. This embodiment may also comprise several co-impregnation steps: steps b) and b1) are carried out simultaneously several times, optionally in the presence of a nickel precursor and/or of an organic compound which is (are) identical or different in each co-impregnation step.

Preferably, steps b) and b1) are carried out simultaneously. Preferably, the volume V2' of the solution comprising at least one precursor of the active nickel phase and at least one organic compound impregnated on the support obtained at the end of step a) (or a1)) is such that V2'=TPV−V1.

Step c)

The drying step c) is advantageously carried out at a temperature below 250° C., preferably between 15° C. and 180° C., more preferentially between 30° C. and 160° C., even more preferentially between 50° C. and 150° C., and even more preferentially between 70° C. and 140° C., for a period of typically between 0.5 hour and 12 hours, and even more preferably for a period of 0.5 hour and 5 hours. Longer periods of time are not ruled out but do not necessarily provide any improvement.

The drying step can be carried out by any technique known to those skilled in the art. It is advantageously carried out under an inert atmosphere or under an oxygen-containing atmosphere or under a mixture of inert gas and oxygen. It is advantageously performed at atmospheric pressure or at reduced pressure. Preferably, this step is carried out at atmospheric pressure and in the presence of air or nitrogen.

At the end of step c), the total or partial presence, or the absence, of the heptanol solution in the catalyst has no effect on the activity and/or the selectivity of the catalyst in the context of the selective hydrogenation of polyunsaturated compounds or the hydrogenation of aromatic compounds.

Step d) (Optional)

The calcining step d) can be carried out at a temperature of between 250° C. and 600° C., preferably between 350° C. and 550° C., for a period typically of between 0.5 hour and 24 hours, preferably for a period of 0.5 hour and 12 hours, and even more preferably for a period of 0.5 hour and 10 hours, preferably under an inert atmosphere or under an oxygen-containing atmosphere. Longer periods of time are not ruled out but do not necessarily provide any improvement.

At the end of step d), the total or partial presence, or the absence, of the heptanol solution in the catalyst has no effect on the activity and/or the selectivity of the catalyst in the context of the selective hydrogenation of polyunsaturated compounds or the hydrogenation of aromatic compounds.

Step e) (Optional)

Prior to the use of the catalyst in the catalytic reactor and the implementation of a hydrogenation process, advantageously at least one reducing treatment step e) is carried out in the presence of a reducing gas after steps c) or d) so as to obtain a catalyst comprising nickel at least partially in the metallic form.

This treatment makes it possible to activate said catalyst and to form metal particles, in particular of nickel in the zero-valent state. Said reducing treatment may be carried out in situ or ex situ, that is to say after or before the charging of the catalyst to the hydrogenation reactor.

The reducing gas is preferably hydrogen. The hydrogen may be used pure or as a mixture (for example a hydrogen/nitrogen, or hydrogen/argon or hydrogen/methane mixture). In the case where the hydrogen is used as a mixture, any proportion may be envisaged.

Said reducing treatment is carried out at a temperature of between 120° C. and 500° C., preferably between 150° C. and 450° C. When the catalyst does not undergo any passivation, or undergoes reducing treatment prior to passivation, the reducing treatment is carried out at a temperature of between 180° C. and 500° C., preferably between 200° C. and 450° C., and even more preferentially between 350° C. and 450° C. When the catalyst has previously undergone passivation, the reducing treatment is generally carried out at a temperature of between 120° C. and 350° C., preferably between 150° C. and 350° C.

The duration of the reducing treatment is generally between 2 hours and 40 hours, preferably between 3 hours and 30 hours. The rise in temperature up to the desired reduction temperature is generally slow, for example set between 0.1° C./min and 10° C./min, preferably between 0.3° C./min and 7° C./min.

The hydrogen flow rate, expressed in l/hour/gram of catalyst, is between 0.01 and 100 l/hour/gram of catalyst, preferably between 0.05 and 10 l/hour/gram of catalyst and more preferably still between 0.1 and 5 l/hour/gram of catalyst.

3. Catalyst

The preparation process according to the invention makes it possible to obtain a catalyst comprising an active phase based on nickel and an alumina support, said catalyst comprising between 1% and 50% by weight of elemental nickel relative to the total weight of the catalyst, the nickel being distributed both over a crust at the periphery of the support, and at the core of the support, the thickness of said crust (also called ep1) being between 2% and 15% of the diameter of the catalyst, the size of the nickel particles, measured in oxide form, in the catalyst is less than 15 nm.

Preferably, the nickel is distributed both on a crust at the periphery of the support, and in the core of the support, the thickness of said crust (also called ep1) being between 2% and 15% of the diameter of the catalyst, preferably between 2.5% and 12% of the diameter of the catalyst, even more preferably between 3% and 10% of the diameter of the catalyst and even more preferably between 3% and 7.5% of the diameter of the catalyst.

Preferably, the nickel density ratio between the crust and the core (also referred to here as $d_{crust}/d_{core}$) is strictly greater than 3, preferably greater than 3.5 and preferably between 3.8 and 15.

Preferably, said crust comprises more than 25% by weight of nickel element relative to the total weight of nickel element contained in the catalyst, preferably more than 40% by weight, more preferentially between 45% and 90% by weight, and even more preferentially between 60% and 90% by weight.

Advantageously, the transition interval between the core and the crust of the catalyst (also referred to here as the core/crust transition interval, or ep2-ep1 according to the notations in FIG. 1), linked to the variation in the nickel density measured over the thickness of the catalyst from the edge of the catalyst to the center of the catalyst, is very abrupt. Preferably, the core/crust transition interval is between 0.05% and 3% of the diameter of the catalyst, preferably between 0.5% and 2.5% of the diameter of the catalyst.

The nickel content in said catalyst is advantageously between 1% and 50% by weight relative to the total weight of the catalyst, more preferentially between 2% and 40% by weight and even more preferentially between 3% and 35% by weight and even more preferentially 5% and 25% by weight relative to the total weight of the catalyst. The values "% by weight" are based on the elemental form of the nickel.

The catalyst can be described as a "semi eggshell" catalyst, i.e. the concentration of nickel is higher at the periphery of the support than in the core of the support, said concentration of nickel in the core of the support being non-zero.

The specific surface area of the catalyst is generally between 10 m²/g and 350 m²/g, preferably between 25 m²/g and 300 m²/g, more preferably between 40 m²/g and 250 m²/g.

The total pore volume of the catalyst is generally between 0.1 ml/g and 1 ml/g, preferably between 0.2 ml/g and 0.8 ml/g, and particularly preferably between 0.3 ml/g and 0.7 ml/g.

The size of the nickel particles, measured in oxide form, in the catalyst is advantageously less than 15 nm, preferably less than 13 nm, preferably less than 10 nm. When step b1) of the process according to the invention is carried out, then the size of the nickel particles, measured in oxide form, in the catalyst is advantageously less than 7 nm, preferably less than 5 nm, more preferentially less than 4 nm, and even more preferentially less than 3 nm.

The active phase of the catalyst does not comprise a metal from group VIB. In particular, it does not comprise molybdenum or tungsten.

Said catalyst (and the support used for the preparation of the catalyst) is in the form of grains advantageously having a diameter of between 0.5 mm and 10 mm. The grains may have any form known to those skilled in the art, for example the form of beads (preferably having a diameter of between 1 mm and 8 mm), of extrudates, of tablets or of hollow cylinders. Preferably, the catalyst (and the support used for the preparation of the catalyst) are in the form of extrudates with a diameter of between 0.5 mm and 10 mm, preferably between 0.8 mm and 3.2 mm and very preferably between 1.0 mm and 2.5 mm and with a length of between 0.5 mm and 20 mm. The "diameter" of the extrudates is intended to mean the diameter of the circle circumscribed in the cross section of these extrudates. The catalyst can advantageously be presented in the form of cylindrical, multilobate, trilobate or quadrilobate extrudates. Preferably its shape is trilobate or quadrilobate. The shape of the lobes can be adjusted according to all the known methods of the prior art.

4. Support

The characteristics of the alumina, mentioned in this section, correspond to the characteristics of the alumina before carrying out step a) of the preparation process according to the invention.

The support is an alumina, that is to say that the support comprises at least 95%, preferably at least 98% and particularly preferably at least 99% by weight of alumina, relative to the weight of the support. The alumina generally exhibits a crystallographic structure of the δ-, γ- or θ-alumina type, alone or as a mixture.

The alumina support may comprise impurities such as oxides of metals from groups IIA, IIIB, IVB, IIB, IIIA and IVA according to the CAS classification, for example silica, titanium dioxide, zirconium dioxide, zinc oxide, magnesium oxide and calcium oxide, or else alkali metals, for example lithium, sodium or potassium, and/or alkaline earth metals, for example magnesium, calcium, strontium or barium, or else sulfur.

The BET specific surface area of the alumina is generally between 10 m²/g and 400 m²/g, preferably between 30 m²/g and 350 m²/g, more preferably between 50 m²/g and 300 m²/g.

The total pore volume of the alumina is generally between 0.1 ml/g and 1.2 ml/g, preferably between 0.3 ml/g and 0.9 ml/g, and very preferably between 0.5 ml/g and 0.9 ml/g.

5. Selective Hydrogenation Process

Another subject of the present invention is a process for the selective hydrogenation of polyunsaturated compounds containing at least 2 carbon atoms per molecule, such as diolefins and/or acetylenics and/or alkenylaromatics, also known as styrenics, contained in a hydrocarbon feedstock having a final boiling point below or equal to 300° C., said process being carried out at a temperature of between 0° C. and 300° C., at a pressure of between 0.1 MPa and 10 MPa, at a hydrogen/(polyunsaturated compounds to be hydrogenated) mole ratio of between 0.1 and 10 and at an hourly space velocity of between 0.1 and 200 h 1 when the process is carried out in the liquid phase, or at a hydrogen/(polyunsaturated compounds to be hydrogenated) mole ratio of between 0.5 and 1000 and at an hourly space velocity of between 100 $h^{-1}$ and 40 000 $h^{-1}$ when the process is carried out in the gas phase, in the presence of a catalyst obtained by the preparation process as described above in the description.

Monounsaturated organic compounds, such as, for example, ethylene and propylene, are at the root of the manufacture of polymers, of plastics and of other chemicals having added value. These compounds are obtained from natural gas, from naphtha or from gas oil which have been treated by steam cracking or catalytic cracking processes. These processes are carried out at high temperature and produce, in addition to the desired monounsaturated compounds, polyunsaturated organic compounds, such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ fraction (hydrocarbon compounds having at least 5 carbon atoms), in particular diolefinic or styrene or indene compounds. These polyunsaturated compounds are highly reactive and result in side reactions in the polymerization units. It is thus necessary to remove them before making economic use of these fractions.

Selective hydrogenation is the main treatment developed to specifically remove undesirable polyunsaturated compounds from these hydrocarbon feedstocks. It enables the conversion of polyunsaturated compounds to the corresponding alkenes or aromatics while avoiding the complete saturation thereof and thus the formation of the corresponding alkanes or naphthenes. In the case of steam cracking gasolines used as feedstock, the selective hydrogenation also makes it possible to selectively hydrogenate the alkenylaromatics to give aromatics while avoiding the hydrogenation of the aromatic rings.

The hydrocarbon feedstock treated in the selective hydrogenation process has a final boiling point of below or equal to 300° C. and contains at least 2 carbon atoms per molecule and comprises at least one polyunsaturated compound. The term "polyunsaturated compounds" is intended to mean compounds comprising at least one acetylenic function and/or at least one diene function and/or at least one alkenylaromatic function.

More particularly, the feedstock is chosen from the group consisting of a steam cracking C2 fraction, a steam cracking C2-C3 fraction, a steam cracking C3 fraction, a steam cracking C4 fraction, a steam cracking C5 fraction and a steam cracking gasoline, also known as pyrolysis gasoline or C5+ fraction.

The steam cracking C2 fraction, advantageously used for the implementation of the selective hydrogenation process according to the invention, exhibits, for example, the following composition: between 40% and 95% by weight of ethylene and of the order of 0.1% to 5% by weight of acetylene, the remainder being essentially ethane and methane. In some steam cracking C2 fractions, between 0.1% and 1% by weight of C3 compounds may also be present.

The steam cracking C3 fraction, advantageously used for the implementation of the selective hydrogenation process according to the invention, exhibits, for example, the following mean composition: of the order of 90% by weight of propylene and of the order of 1% to 8% by weight of propadiene and of methylacetylene, the remainder being essentially propane. In some C3 fractions, between 0.1% and 2% by weight of C2 compounds and of C4 compounds may also be present.

A C2-C3 fraction can also advantageously be used for the implementation of the selective hydrogenation process according to the invention. It exhibits, for example, the following composition: of the order of 0.1% to 5% by weight of acetylene, of the order of 0.1% to 3% by weight of propadiene and of methylacetylene, of the order of 30% by weight of ethylene and of the order of 5% by weight of propylene, the remainder being essentially methane, ethane and propane. This feedstock may also contain between 0.1% and 2% by weight of C4 compounds.

The steam cracking C4 fraction, advantageously used for the implementation of the selective hydrogenation process according to the invention, exhibits, for example, the following mean composition by weight: 1% by weight of butane, 46.5% by weight of butene, 51% by weight of butadiene, 1.3% by weight of vinylacetylene and 0.2% by weight of butyne. In some C4 fractions, between 0.1% and 2% by weight of C3 compounds and of C5 compounds may also be present.

The steam cracking C5 fraction, advantageously used for the implementation of the selective hydrogenation process according to the invention, exhibits, for example, the following composition: 21% by weight of pentanes, 45% by weight of pentenes and 34% by weight of pentadienes.

The steam cracking gasoline or pyrolysis gasoline, advantageously used for the implementation of the selective hydrogenation process according to the invention, corresponds to a hydrocarbon fraction, the boiling point of which is generally between 0° C. and 300° C., preferably between 10° C. and 250° C. The polyunsaturated hydrocarbons to be hydrogenated present in said steam cracking gasoline are in particular diolefin compounds (butadiene, isoprene, cyclopentadiene, and the like), styrene compounds (styrene, α-methylstyrene, and the like) and indene compounds (indene, and the like). The steam cracking gasoline generally comprises the C5-C12 fraction with traces of C3, C4, C13, C14 and C15 (for example between 0.1% and 3% by weight for each of these fractions). For example, a feedstock formed of pyrolysis gasoline generally has a composition as follows: 5% to 30% by weight of saturated compounds (paraffins and naphthenes), 40% to 80% by weight of aromatic compounds, 5% to 20% by weight of mono-olefins, 5% to 40% by weight of diolefins and 1% to 20% by weight of alkenylaromatic compounds, the combined compounds forming 100%. It also contains from 0 to 1000 ppm by weight of sulfur, preferably from 0 to 500 ppm by weight of sulfur.

Preferably, the polyunsaturated hydrocarbon feedstock treated in accordance with the selective hydrogenation process according to the invention is a steam cracking C2 fraction or a steam cracking C2-C3 fraction or a steam cracking gasoline.

The selective hydrogenation process according to the invention is targeted at removing said polyunsaturated hydrocarbons present in said feedstock to be hydrogenated without hydrogenating the monounsaturated hydrocarbons. For example, when said feedstock is a C2 fraction, the selective hydrogenation process is targeted at selectively hydrogenating acetylene. When said feedstock is a C3 fraction, the selective hydrogenation process is targeted at selectively hydrogenating propadiene and methylacetylene. In the case of a C4 fraction, the aim is to remove butadiene, vinylacetylene (VAC) and butyne; in the case of a C5 fraction, the aim is to remove the pentadienes. When said feedstock is a steam cracking gasoline, the selective hydrogenation process is targeted at selectively hydrogenating said polyunsaturated hydrocarbons present in said feedstock to be treated so that the diolefin compounds are partially hydrogenated to give mono-olefins and so that the styrene and indene compounds are partially hydrogenated to give corresponding aromatic compounds while avoiding the hydrogenation of the aromatic rings.

The technological implementation of the selective hydrogenation process is, for example, carried out by injection, as upflow or downflow, of the polyunsaturated hydrocarbon feedstock and of the hydrogen into at least one fixed bed reactor. Said reactor can be of isothermal type or of adiabatic type. An adiabatic reactor is preferred. The polyunsaturated hydrocarbon feedstock can advantageously be diluted by one or more reinjection(s) of the effluent, resulting from said reactor where the selective hydrogenation reaction takes place, at various points of the reactor, located between the inlet and the outlet of the reactor, in order to limit the temperature gradient in the reactor. The technological implementation of the selective hydrogenation process according to the invention can also advantageously be carried out by the implantation of at least said supported catalyst in a reactive distillation column or in reactors-exchangers or in a slurry-type reactor. The stream of hydrogen can be introduced at the same time as the feedstock to be hydrogenated and/or at one or more different points of the reactor.

The selective hydrogenation of the steam cracking C2, C2-C3, C3, C4, C5 and C5+ fractions can be carried out in the gas phase or in the liquid phase, preferably in the liquid phase for the C3, C4, C5 and C5+ fractions and in the gas phase for the C2 and C2-C3 fractions. A liquid-phase reaction makes it possible to lower the energy cost and to increase the cycle period of the catalyst.

In general, the selective hydrogenation of a hydrocarbon feedstock containing polyunsaturated compounds containing at least 2 carbon atoms per molecule and having a final boiling point below or equal to 300° C. is carried out at a temperature of between 0° C. and 300° C., at a pressure of between 0.1 MPa and 10 MPa, at a hydrogen/(polyunsaturated compounds to be hydrogenated) mole ratio of between 0.1 and 10 and at an hourly space velocity (defined as the ratio of the volume flow rate of feedstock to the volume of catalyst) of between 0.1 $h^{-1}$ and 200 $h^{-1}$ for a process carried out in the liquid phase, or at a hydrogen/(polyunsaturated compounds to be hydrogenated) mole ratio of between 0.5 and 1000 and at an hourly space velocity of between 100 and 40 000 $h^{-1}$ for a process carried out in the gas phase.

In one embodiment according to the invention, when a selective hydrogenation process is carried out wherein the feedstock is a steam cracking gasoline comprising polyunsaturated compounds, the (hydrogen)/(polyunsaturated compounds to be hydrogenated) mole ratio is generally between 0.5 and 10, preferably between 0.7 and 5.0 and more preferably still between 1.0 and 2.0, the temperature is between 0° C. and 200° C., preferably between 20° C. and 200° C. and more preferably still between 30° C. and 180° C., the hourly space velocity (HSV) is generally between 0.5 $h^{-1}$ and 100 $h^{-1}$, preferably between 1 and 50 $h^{-1}$, and the pressure is generally between 0.3 MPa and 8.0 MPa, preferably between 1.0 MPa and 7.0 MPa and more preferably still between 1.5 MPa and 4.0 MPa.

More preferentially, a selective hydrogenation process is carried out wherein the feedstock is a steam cracking gasoline comprising polyunsaturated compounds, the hydrogen/(polyunsaturated compounds to be hydrogenated) mole ratio is between 0.7 and 5.0, the temperature is between 20° C. and 200° C., the hourly space velocity (HSV) is generally between 1 h 1 and 50 h 1 and the pressure is between 1.0 MPa and 7.0 MPa.

More preferentially still, a selective hydrogenation process is carried out wherein the feedstock is a steam cracking gasoline g polyunsaturated compounds, the hydrogen/(polyunsaturated compounds to be hydrogenated) mole ratio is between 1.0 and 2.0, the temperature is between 30° C. and 180° C., the hourly space velocity (HSV) is generally between 1 $h^{-1}$ and 50 $h^{-1}$ and the pressure is between 1.5 MPa and 4.0 MPa.

The hydrogen flow rate is adjusted in order to have available a sufficient amount thereof to theoretically hydrogenate all of the polyunsaturated compounds and to maintain an excess of hydrogen at the reactor outlet.

In another embodiment according to the invention, when a selective hydrogenation process is carried out wherein the feedstock is a steam cracking C2 fraction and/or a steam cracking C2-C3 fraction comprising polyunsaturated compounds, the (hydrogen)/(polyunsaturated compounds to be hydrogenated) mole ratio is generally between 0.5 and 1000, preferably between 0.7 and 800, the temperature is between 0° C. and 300° C., preferably between 15° C. and 280° C., the hourly space velocity (HSV) is generally between 100 $h^{-1}$ and 40 000 $h^{-1}$, preferably between 500 $h^{-1}$ and 30 000 $h^{-1}$, and the pressure is generally between 0.1 MPa and 6.0 MPa, preferably between 0.2 MPa and 5.0 MPa.

6. Process for the Hydrogenation of Aromatics

Another subject of the present invention is a process for the hydrogenation of at least one aromatic or polyaromatic compound contained in a hydrocarbon feedstock having a final boiling point below or equal to 650° C., generally between 20° C. and 650° C., and preferably between 20° C. and 450° C. Said hydrocarbon feedstock containing at least one aromatic or polyaromatic compound can be chosen from the following petroleum or petrochemical fractions: the reformate from catalytic reforming, kerosene, light gas oil, heavy gas oil, cracking distillates, such as FCC recycle oil, coking unit gas oil or hydrocracking distillates. The content of aromatic or polyaromatic compounds contained in the hydrocarbon feedstock treated in the hydrogenation process according to the invention is generally between 0.1% and 80% by weight, preferably between 1% and 50% by weight and particularly preferably between 2% and 35% by weight, the percentage being based on the total weight of the hydrocarbon feedstock. The aromatic compounds present in said hydrocarbon feedstock are, for example, benzene or alkylaromatics, such as toluene, ethylbenzene, o-xylene, m-xylene or p-xylene, or also aromatics having several aromatic rings (polyaromatics), such as naphthalene.

The sulfur or chlorine content of the feedstock is generally less than 5000 ppm by weight of sulfur or chlorine, preferably less than 100 ppm by weight and particularly preferably less than 10 ppm by weight.

The technological implementation of the process for the hydrogenation of aromatic or polyaromatic compounds is, for example, carried out by injection, as upflow or downflow, of the hydrocarbon feedstock and of the hydrogen into at least one fixed bed reactor. Said reactor can be of isothermal type or of adiabatic type. An adiabatic reactor is preferred. The hydrocarbon feedstock can advantageously be diluted by one or more reinjection(s) of the effluent, resulting from said reactor where the reaction for the hydrogenation of the aromatics takes place, at various points of the reactor, located between the inlet and the outlet of the reactor, in order to limit the temperature gradient in the reactor. The technological implementation of the process for the hydrogenation of the aromatics according to the invention may also advantageously be carried out by the implantation of at least said supported catalyst in a reactive distillation column or in reactors-exchangers or in a slurry-type reactor. The stream of hydrogen can be introduced at the same time as the feedstock to be hydrogenated and/or at one or more different points of the reactor.

The hydrogenation of the aromatic or polyaromatic compounds can be carried out in the gas phase or in the liquid phase, preferably in the liquid phase. Generally, the hydrogenation of the aromatic or polyaromatic compounds is carried out at a temperature of between 30° C. and 350° C., preferably between 50° C. and 325° C., at a pressure of between 0.1 MPa and 20 MPa, preferably between 0.5 MPa and 10 MPa, at a hydrogen/(aromatic compounds to be hydrogenated) mole ratio of between 0.1 and 10 and at an hourly space velocity of between 0.05 $h^{-1}$ and 50 $h^{-1}$, preferably between 0.1 $h^{-1}$ and 10 $h^{-1}$, of a hydrocarbon feedstock containing aromatic or polyaromatic compounds and having a final boiling point below or equal to 650° C., generally between 20° C. and 650° C., and preferably between 20° C. and 450° C. The hydrogen flow rate is adjusted in order to have available a sufficient amount thereof to theoretically hydrogenate all of the aromatic compounds and to maintain an excess of hydrogen at the reactor outlet.

The conversion of the aromatic or polyaromatic compounds is generally greater than 20 mol %, preferably greater than 40 mol %, more preferably greater than 80 mol % and particularly preferably greater than 90 mol % of the aromatic or polyaromatic compounds contained in the hydrocarbon feedstock. The conversion is calculated by dividing the difference between the total moles of the aromatic or polyaromatic compounds in the hydrocarbon feedstock and in the product by the total moles of the aromatic or polyaromatic compounds in the hydrocarbon feedstock.

According to a specific alternative form of the process according to the invention, a process for the hydrogenation of the benzene of a hydrocarbon feedstock, such as the reformate resulting from a catalytic reforming unit, is carried out. The benzene content in said hydrocarbon feedstock is generally between 0.1% and 40% by weight, preferably between 0.5% and 35% by weight and particularly preferably between 2% and 30% by weight, the percentage by weight being based on the total weight of the hydrocarbon feedstock. The sulfur or chlorine content of the feedstock is generally less than 10 ppm by weight of sulfur or chlorine respectively and preferably less than 2 ppm by weight.

The hydrogenation of the benzene contained in the hydrocarbon feedstock can be carried out in the gas phase or in the liquid phase, preferably in the liquid phase. When it is carried out in the liquid phase, a solvent can be present, such as cyclohexane, heptane or octane. Generally, the hydrogenation of the benzene is carried out at a temperature of between 30° C. and 250° C., preferably between 50° C. and 200° C. and more preferably between 80° C. and 180° C., at a pressure of between 0.1 MPa and 10 MPa, preferably between 0.5 MPa and 4 MPa, at a hydrogen/(benzene) mole ratio of between 0.1 and 10 and at an hourly space velocity of between 0.05 $h^{-1}$ and 50 $h^{-1}$, preferably between 0.5 $h^{-1}$ and 10 $h^{-1}$.

The conversion of the benzene is generally greater than 50 mol %, preferably greater than 80 mol %, more preferably greater than 90 mol % and particularly preferably greater than 98 mol %.

The invention will now be illustrated via the examples below which are in no way limiting.

EXAMPLES

For all the catalysts mentioned in the examples below, the support is an alumina A having a specific surface area of 80 $m^2/g$, a total pore volume (TPV) of 0.7 ml/g and a median mesopore diameter of 12 nm.

WTV means water take-up volume.

Example 1: Preparation of an Aqueous Solution of Ni Precursor With Additive

The aqueous solution S used for the preparation of catalysts B to H is prepared by dissolving 43.5 g of nickel nitrate ($NiNO_3$, supplier Strem Chemicals®) and 7.69 g of malonic acid (CAS 141-82-2; supplier Fluka®) in a volume of 13 ml of distilled water. The molar ratio of additive/Ni is fixed at 0.5. The solution S, the Ni concentration of which is 350 g of Ni per liter of solution, is obtained.

Example 1a: Preparation of an Aqueous Solution of Ni Precursor Without Additive The aqueous solution S' used for the preparation of catalyst A is prepared by dissolving 43.5 g of nickel nitrate ($NiNO_3$, supplier Strem Chemicals®) in a volume of 13 ml of distilled water. The solution S', the Ni concentration of which is 350 g of Ni per liter of solution, is obtained.

Example 2: Preparation of a Catalyst a According to the Invention [10 wt % of Ni-Heptanol 25% WTV in Pre-Impregnation]

10 g of alumina A are impregnated with 2.4 ml of n-heptanol added dropwise. The impregnated support is then left to mature for 30 min at 60° C. Next, 7.1 ml of solution S' prepared in example 1a is impregnated dropwise on the impregnated support. The catalyst precursor thus obtained is subsequently dried in an oven at 120° C. for 12 hours and then calcined under a stream of dry air of 1 l/h/g of catalyst at 450° C. for 2 hours.

Catalyst A containing 10% by weight of the nickel element relative to the total weight of the catalyst is obtained.

The characteristics of catalyst A thus obtained are given in table 1 below.

Example 3: Preparation of a Catalyst B According to the Invention [10 wt % of Ni-Heptanol 25% WTV in Pre-Impregnation+Additive]

10 g of alumina A are impregnated with 2.4 ml of n-heptanol added dropwise. The impregnated support is then left to mature for 30 min at 60° C. Next, 7.1 ml of solution S prepared in example 1 is impregnated dropwise on the impregnated support. The catalyst precursor thus obtained is subsequently dried in an oven at 120° C. for 12 hours and then calcined under a stream of dry air of 1 l/h/g of catalyst at 450° C. for 2 hours.

Catalyst B containing 10% by weight of the nickel element relative to the total weight of the catalyst is obtained.

The characteristics of catalyst B thus obtained are given in table 1 below.

Example 4: Preparation of a Catalyst C According to the Invention [5 wt % of Ni-Heptanol 25% WTV in Pre-Impregnation+Additive]

10 g of alumina A are impregnated with 2.4 ml of n-heptanol added dropwise. The impregnated support is then left to mature for 30 min at 60° C. Next, 3.55 ml of solution S prepared in example 1 diluted with water in order to make it up to 7.1 ml is impregnated dropwise on the impregnated support. The catalyst precursor thus obtained is subsequently dried in an oven for 12 hours at 120° C. and then calcined under a stream of dry air of 1 l/h/g of catalyst at 450° C. for 2 hours.

Catalyst C containing 5% by weight of the nickel element relative to the total weight of the catalyst is obtained.

The characteristics of catalyst C thus obtained are given in table 1 below.

Example 5: Preparation of a Catalyst D According to the Invention [10 wt % of Ni-Heptanol 75% of WTV in Pre-Impregnation+Additive]

10 g of alumina A are impregnated with 7.2 ml of n-heptanol added dropwise. The impregnated support is then left to mature for 30 min at 60° C. Next, 2.4 ml of solution S prepared in example 1 is impregnated dropwise on the impregnated support. The catalyst precursor thus obtained is subsequently dried in an oven for 12 hours at 120° C. and then calcined under a stream of dry air of 1 l/h/g of catalyst at 450° C. for 2 hours.

Catalyst D containing 10% by weight of the nickel element relative to the total weight of the catalyst is obtained.

The characteristics of catalyst D thus obtained are given in table 1 below.

Example 6: Preparation of a Catalyst E not in Accordance with the Invention [Conventional Impregnation 10% of Ni+Additive]

The solution S prepared in example 1 is dry impregnated, by adding it dropwise, on 10 g of alumina. The catalyst precursor thus obtained is subsequently dried in an oven for 12 hours at 120° C. and then calcined under a stream of dry air of 1 l/h/g of catalyst at 450° C. for 2 hours. Catalyst E containing 10% by weight of the nickel element relative to the total weight of the catalyst is obtained.

The characteristics of catalyst E thus obtained are given in table 1 below.

Example 7: Preparation of a Catalyst F not in Accordance with the Invention [10 wt % of Ni-Heptanol 25% WTV in Post-Impregnation]

7.1 ml of solution S prepared in example 1 is dry impregnated, by adding it dropwise, on 10 g of alumina. The 10 g of the catalyst precursor prepared are impregnated with 2.4 ml of n-heptanol added dropwise. The solid is then left to mature for 30 min at 60° C.

The solid thus obtained is subsequently dried in an oven for 12 hours at 120° C. and then calcined under a stream of dry air of 1 l/h/g of catalyst at 450° C. for 2 hours.

Catalyst F containing 10% by weight of the nickel element relative to the total weight of the catalyst is obtained.

The characteristics of catalyst F thus obtained are given in table 1 below.

Example 8: Preparation of a Catalyst G not in Accordance with the Invention [10 wt % of Ni-Toluene 25% WTV in Pre-Impregnation]

10 g of alumina A are impregnated with 2.4 ml of toluene added dropwise. The impregnated support is then left to mature for 30 min at 60° C. Next, 7.1 ml of solution S prepared in example 1 is impregnated dropwise on the impregnated support. The catalyst precursor thus obtained is subsequently dried in an oven at 120° C. for 12 hours and then calcined under a stream of dry air of 1 l/h/g of catalyst at 450° C. for 2 hours.

Catalyst G containing 10% by weight of the nickel element relative to the total weight of the catalyst is obtained.

The characteristics of catalyst G thus obtained are given in table 1 below.

Example 9: Preparation of a Catalyst H not in Accordance with the Invention [10 wt % of Ni-n-Propanol 25% WTV in Pre-Impregnation]

10 g of alumina A are impregnated with 2.4 ml of n-propanol added dropwise. The impregnated support is then left to mature for 30 min at 60° C. Next, 7.1 ml of solution S prepared in example 1 is impregnated dropwise on the impregnated support. The catalyst precursor thus obtained is subsequently dried in an oven at 120° C. for 12 hours and then calcined under a stream of dry air of 1 l/h/g of catalyst at 450° C. for 2 hours.

Catalyst H containing 10% by weight of the nickel element relative to the total weight of the catalyst is obtained.

The characteristics of catalyst H thus obtained are given in table 1 below.

TABLE 1

Characteristics of catalysts A to H

| Catalyst | "Solvent" | Ni (wt %) | Particle size (nm) | Crust thickness/ grain diameter (%) | $d_{crust}/d_{core}$ | Ni content in crust/ total Ni (%) |
|---|---|---|---|---|---|---|
| A (in accordance) | 25% n-heptanol in pre-impregnation | 10 | 8 | 6.8 | 6 | 68 |
| B (in accordance) | 25% n-heptanol in pre-impregnation | 10 | 2.2 | 6.8 | 5.9 | 61 |
| C (in accordance) | 25% n-heptanol in pre-impregnation | 5 | 2.1 | 3.8 | 13 | 70 |
| D (in accordance) | 75% n-heptanol in pre-impregnation | 10 | 2.3 | 4.7 | 11 | 74 |
| E (not in accordance) | — | 10 | 2.3 | <1% | 1.5 | 7 |
| F (not in accordance) | 25% n-heptanol in post-impregnation | 10 | 2.3 | Homogeneous distribution | — | — |
| G (not in accordance) | 25% toluene in pre-impregnation | 10 | 2.3 | Homogeneous distribution | — | — |
| H (not in accordance) | 25% n-propanol in pre-impregnation | 10 | 2.3 | Homogeneous distribution | — | — |

Example 10: Catalytic Tests: Performance in Selective Hydrogenation of a Mixture Containing Styrene and Isoprene ($A_{HYD1}$)

Catalysts A to H described in the examples above are tested with regard to the reaction for the selective hydrogenation of a mixture containing styrene and isoprene.

The composition of the feedstock to be selectively hydrogenated is as follows: 8 wt % styrene (supplier Sigma Aldrich®, purity 99%), 8 wt % isoprene (supplier Sigma Aldrich®, purity 99%) and 84 wt % n-heptane (solvent) (supplier VWR®, purity>99% Chromanorm HPLC). This feedstock also contains a very low content of sulfur compounds: 10 ppm by weight of sulfur introduced in pentanethiol form (supplier Fluka®, purity>97%) and 100 ppm by weight of sulfur introduced in thiophene form (supplier Merck®, purity 99%). This composition corresponds to the initial composition of the reaction mixture. This mixture of model molecules is representative of a pyrolysis gasoline.

The selective hydrogenation reaction is carried out in a 500 ml stainless steel autoclave which is provided with a magnetically-driven mechanical stirrer and which is able to operate under a maximum pressure of 100 bar (10 MPa) and temperatures of between 5° C. and 200° C.

Prior to its introduction into the autoclave, an amount of 3 ml of catalyst is reduced ex situ under a hydrogen stream of 1 l/h/g of catalyst, at 400° C. for 16 hours (temperature rise gradient of 1° C./min), then it is transferred into the autoclave, with air excluded. After addition of 214 ml of n-heptane (supplier VWR®, purity>99% Chromanorm HPLC), the autoclave is closed, purged, then pressurized under 35 bar (3.5 MPa) of hydrogen, and brought to the test temperature equal to 30° C. At time t=0, approximately 30 g of a mixture containing styrene, isoprene, n-heptane, pentanethiol and thiophene are introduced into the autoclave. The reaction mixture then has the composition described above and stirring is started at 1600 rpm. The pressure is kept constant at 35 bar (3.5 MPa) in the autoclave using a storage cylinder located upstream of the reactor.

The progress of the reaction is monitored by taking samples from the reaction medium at regular time intervals: the styrene is hydrogenated to give ethylbenzene, without hydrogenation of the aromatic ring, and the isoprene is hydrogenated to give methylbutenes. If the reaction is prolonged for longer than necessary, the methylbutenes are in their turn hydrogenated to give isopentane. The hydrogen consumption is also monitored over time by the decrease in pressure in a storage cylinder located upstream of the reactor. The catalytic activity is expressed in moles of H2 consumed per minute and per gram of Ni.

The catalytic activities measured for catalysts A to H are given in table 2 below. They are related to the catalytic activity ($A_{HYD1}$) measured for catalyst E.

Example 11: Catalytic Tests: Performance in Hydrogenation of Toluene ($A_{HYD2}$)

Catalysts A to H described in the above examples are also tested with regard to the reaction for the hydrogenation of toluene.

The selective hydrogenation reaction is carried out in the same autoclave as that described in example 9.

Prior to its introduction into the autoclave, an amount of 2 ml of catalyst is reduced ex situ under a hydrogen stream of 1 l/h/g of catalyst, at 400° C. for 16 hours (temperature rise gradient of 1° C./min), then it is transferred into the autoclave, with air excluded. After addition of 216 ml of n-heptane (supplier VWR®, purity>99% Chromanorm HPLC), the autoclave is closed, purged, then pressurized under 35 bar (3.5 MPa) of hydrogen and brought to the test temperature, equal to 80° C. At time t=0, approximately 26 g of toluene (supplier SDS®, purity>99.8%) are introduced into the autoclave (the initial composition of the reaction mixture is then 6 wt % toluene/94 wt % n-heptane) and stirring is started at 1600 rpm. The pressure is kept constant at 35 bar (3.5 MPa) in the autoclave using a storage cylinder located upstream of the reactor.

The progress of the reaction is monitored by taking samples from the reaction medium at regular time intervals: the toluene is completely hydrogenated to give methylcyclohexane. The hydrogen consumption is also monitored over time by the decrease in pressure in a storage cylinder located upstream of the reactor. The catalytic activity is expressed in moles of H2 consumed per minute and per gram of Ni.

The catalytic activities measured for catalysts A to H are given in table 2 below. They are related to the catalytic activity ($A_{HYD2}$) measured for catalyst E.

TABLE 2

Comparison of the performances of catalysts A to H in terms of selective hydrogenation of a mixture containing styrene and isoprene ($A_{HYD1}$) and in terms of hydrogenation of toluene ($A_{HYD2}$)

| Catalyst | Content of Ni$^0$ (%) | $A_{HYD1}$ (%) | $A_{HYD2}$ (%) |
|---|---|---|---|
| A (in accordance) | 10 | 105 | 110 |
| B (in accordance) | 10 | 170 | 200 |
| C (in accordance) | 5 | 130 | 160 |
| D (in accordance) | 10 | 185 | 220 |
| E (not in accordance) | 10 | 100 | 100 |
| F (not in accordance) | 10 | 50 | 50 |
| G (not in accordance) | 10 | 70 | 80 |
| H (not in accordance) | 10 | 95 | 98 |

These examples clearly show the improved performance of catalysts A, B, C and D according to the invention, compared to catalysts E, F, G and H not in accordance with the invention. This is explained by the distribution of the nickel in the crust on catalysts A, B, C and D, which gives them a markedly improved activity, in particular in rapid hydrogenation reactions. Despite the fact that the particles are larger in size (8 nm) since malonic acid has not been used, catalyst A remains quite effective as the nickel is well distributed in the crust and therefore very accessible. Catalyst E has lower activity due to the conventional impregnation carried out without pre-impregnation of heptanol. Catalyst F underwent a post-impregnation with heptanol which does not allow a crust distribution of the nickel. Catalyst G is prepared with a step of pre-impregnation with toluene. Thus, although toluene is not very miscible with water, as in the case of heptanol, the absence of —OH groups in the molecule does not enable it to have a strong interaction with the —OH groups of the alumina support, which may explain the migration of toluene via the water contained in the nickel nitrate solution during the nickel impregnation step. In the case of propanol, the —OH groups appear to allow it to both go to the core of the support and to interact with the support. On the other hand, as water and n-propanol are highly miscible, unlike the heptanol/water pair, diffusion of the aqueous nickel nitrate solution to the core appears to take place considering both the physicochemical characteristics of the final catalyst obtained and the results of catalytic tests. Thus, for catalysts F, G and H, the nickel is distributed homogeneously throughout the catalyst grain. Catalysts F and G therefore have a much lower activity than catalyst A in terms of $A_{HYD1}$ and $A_{HYD2}$. Catalyst G is lower due to the presence of toluene which disrupts the impregnation of the nickel nitrate solution.

The invention claimed is:

1. A process for preparing a catalyst comprising an active phase based on nickel and alumina support, said catalyst comprising between 1% and 50% by weight of elemental nickel relative to the total weight of the catalyst, the nickel being distributed both over a crust at the periphery of the support, and at the core of the support, the thickness of said crust being between 2% and 15% of the diameter of the catalyst, the size of the nickel particles in the catalyst, measured in oxide form, being less than 15 nm, which process comprises:

a) impregnating said support with a volume V1 of a heptanol solution of between 0.2 and 0.8 times the total pore volume TPV of said support in order to obtain an impregnated support;
b) impregnating the impregnated support obtained at the end of a) with a solution comprising at least one precursor of the nickel active phase in order to obtain a catalyst precursor; and
c) drying the catalyst precursor obtained at the end of b) at a temperature below 250° C.

2. The process as claimed in claim 1, wherein, in b), the volume V2 of the solution comprising at least one precursor of the nickel active phase impregnated on the impregnated support obtained at the end of a) is such that V2=TPV−V1.

3. The process as claimed in claim 1, wherein c) is carried out for a time of between 0.5 hour and 12 hours.

4. The process as claimed in claim 1, further comprising d) calcining the catalyst obtained at the end of c) at a temperature of between 250° C. and 600° C.

5. The process as claimed in claim 4, wherein d) is carried out for between 0.5 hour and 24 hours.

6. The process as claimed in claim 1, wherein, in a), said volume V1 of said heptanol solution is between 0.25 and 0.75 times the total pore volume TPV of said support.

7. The process as claimed in claim 1, wherein, in a), a solution of n-heptanol is used.

8. The process as claimed in claim 1, further comprising b1) wherein either the impregnated support obtained at the end of a), or the catalyst precursor obtained at the end of b), is impregnated with at least one solution containing at least one organic compound comprising at least one carboxylic acid function, or at least one alcohol function, or at least one ester function, or at least one amide function, or at least one amine function, b) and b1) being carried out in any order, or simultaneously.

9. The process as claimed in claim 8, wherein the volume V2 of the solution comprising at least one precursor of the active nickel phase and the volume V3 of the solution comprising at least one organic compound which are impregnated on the impregnated support obtained at the end of a) are such that V2+V3=TPV−V1.

10. The process as claimed in claim 8, wherein the b) and b1) are carried out simultaneously.

11. The process as claimed in claim 10, wherein the volume V2' of the solution comprising at least one precursor of the active nickel phase and at least one organic compound which are impregnated on the impregnated support obtained at the end of a) is such that V2'=TPV−V1.

12. The process as claimed in claim 8, wherein the mole ratio of said organic compound introduced in b1) to the nickel element also introduced in b) is between 0.01 and 5.0 mol/mol.

13. The process as claimed in claim 8, wherein the organic compound of b1) is chosen from oxalic acid, malonic acid, glycolic acid, lactic acid, tartronic acid, citric acid, tartaric acid, pyruvic acid, levulinic acid, ethylene glycol, propane-1,3-diol, butane-1,4-diol, glycerol, xylitol, mannitol, sorbitol, diethylene glycol, glucose, gamma-valerolactone, dimethyl carbonate, diethyl carbonate, formamide, N-methylformamide, acetamide, N-methylacetamide, N,N-dimethylmethanamide, 2-pyrrolidone, γ-lactam, lactamide, urea, alanine, arginine, lysine, proline, serine, and EDTA.

14. The process as claimed in claim 1, further comprising a1) maturing the impregnated support obtained at the end of a) for 0.5 hour to 40 hours.

15. The process as claimed in claim 8, wherein the size of the nickel particles in the catalyst, measured in oxide form, is less than 13 nm.

\* \* \* \* \*